May 6, 1930.  E. D. WEAVER ET AL  1,757,067
STOCK REMOVER
Filed May 4, 1928
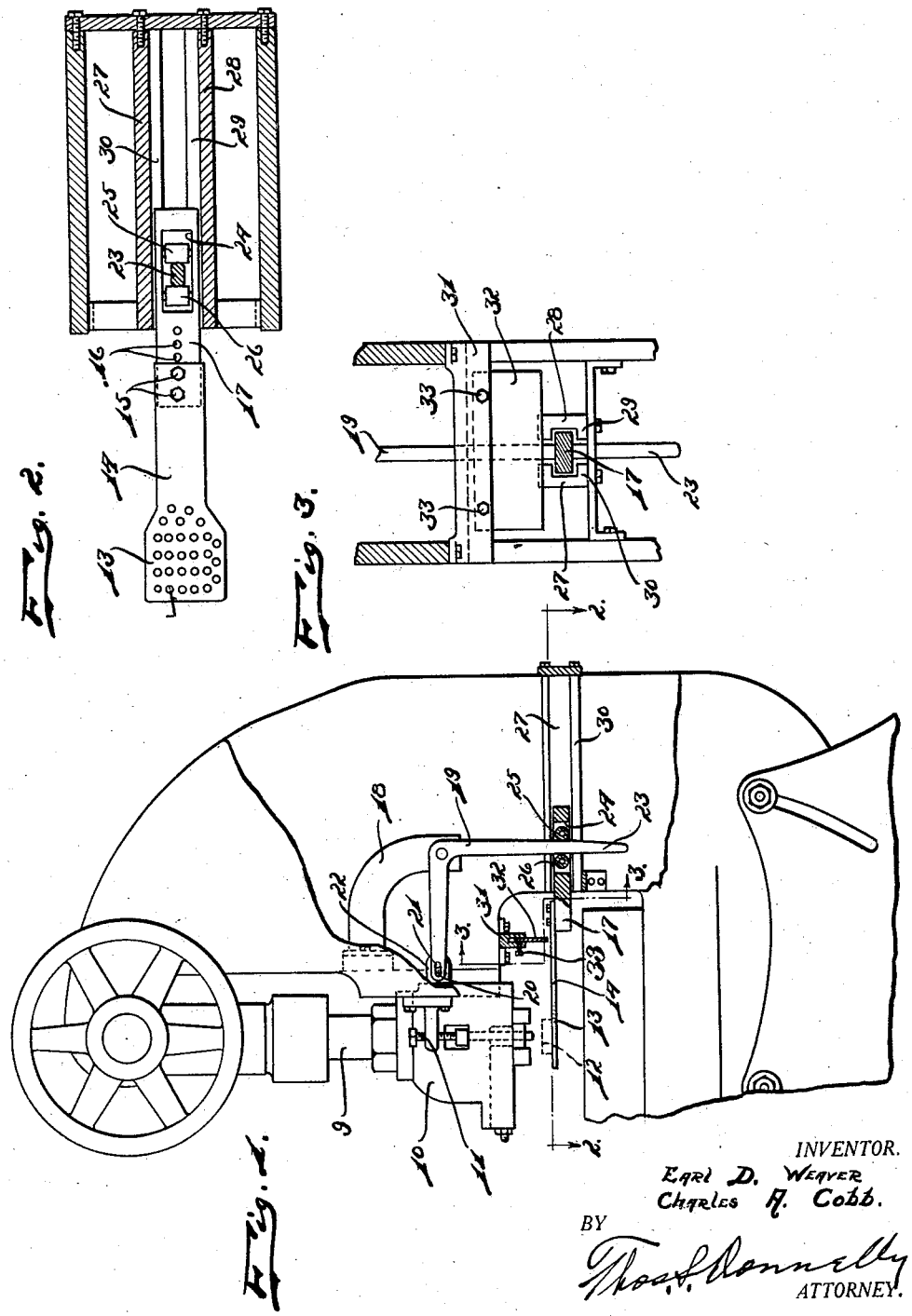
INVENTOR.
Earl D. Weaver
Charles A. Cobb.
BY
ATTORNEY.

Patented May 6, 1930

1,757,067

UNITED STATES PATENT OFFICE

EARL D. WEAVER, OF HALFWAY, AND CHARLES A. COBB, OF DETROIT, MICHIGAN

STOCK REMOVER

Application filed May 4, 1928. Serial No. 274,980.

Our invention relates to a new and useful improvement in a stock remover adapted for use on punch presses and other similar devices.

It is an object of the present invention to provide a device whereby stock may be readily removed from position after it has been operated upon by the machine so that the necessity of an operator placing his hands in the path of the moving parts of the machine in order to remove the stock therefrom may be avoided.

It is another object of the invention to provide a device of this class which will be simple in structure, economical of manufacture, highly efficient and durable in use, and automatic in operation.

It is another object of the invention to provide a stock remover whereby the efficiency and speed of the machine with which used may be increased.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention showing it applied to a machine, with parts broken away and parts shown in section.

Fig. 2 is a view taken on line 2—2 of Fig. 1.

Fig. 3 is a view taken on line 3—3 of Fig. 1.

In the drawings we have illustrated the invention applied to a punch press having the ram 9 which moves in conjunction with the head 10, cooperating with which are the strippers 11 for removing the workpiece 12 from the punch after operation.

The invention comprises a conveying platform or work supporting member 13 which in one position is located beneath the punch and adapted to receive the workpiece 12 which is stripped therefrom.

As shown in Fig. 2, this table or conveying member 13 is perforated and provided with an elongated shank 14 having holes formed therein, through which bolts 15 may be projected which serve to pass through openings 16 formed in the operating shank 17, a plurality of these openings being provided for the purpose of adjustment. Extending outwardly from the punch is a stationary bracket 18 on which is pivoted the bell crank 19, one end of which is provided with a slot 20 through which is extended a pin 21 carried by the lug 22 which is reciprocated upon reciprocation of the ram 9. The opposite end of the bell crank projects through a slot 24 formed in the shank 11 and between rollers 25 and 26 which are rotatably mounted in the slot 24 upon the shank 17. This shank 17 is adapted for reciprocating movement between the guide plates 27 and 28 which have the inwardly projecting flanges 29 and 30. Mounted upon the stationary part of the punch press is a plate 31 which is slotted as shown in Fig. 1. Inserted into the slot is a scraper 32 which is secured in position by the set screw 33.

In operation, as the ram 9 is moved downwardly, the bell crank is rocked on its pivot, the end 23 forcing the shank 17 to move outwardly so that the conveyor 13 is moved out of the path of the punch which is forced downwardly by the ram 9. As the punch moves upwardly the bell crank is rocked in the opposite direction and the end 23 of the bell crank again moves the shank in the opposite direction, bringing the platform 13 into the position shown in Fig. 1, thus being in a position to receive the workpiece 12 when the same is stripped from the punch. At the next downward movement of the ram the workpiece is carried outwardly until it engages the scraper 32, this scraper 32 serving to dislodge the workpiece from the member 13, permitting it to fall downwardly where it can be removed to a desired location. If desired, a hopper may be provided for receiving the workpiece when scraped from the member 13. In this way the necessity of the operator placing his hand in the path of the punch in order to remove the workpiece is eliminated, and thus a safety factor in operating is added, with a consequent speeding up of the production of the machine.

While we have illustrated and described the preferred form of our invention, we do not wish to limit ourselves to the precise details of structure shown, but desire to avail ourselves of such variations and modifications as come within the scope of the appended claims.

Having thus described our invention, what we claim as new and desire to secure by Letters Patent is:

1. A stock remover of the class described adapted for use with a machine having a movable part operating on a workpiece, comprising: a member constructed and arranged to be rocked by the movable part of said machine; a workpiece receiving member constructed and arranged to be reciprocated by said rockable member, said workpiece receiving member, upon rocking of said rockable member into one position, being located in the path of the movable part of said machine and adapted for receiving a workpiece therefrom; and a stripper plate engageable with said workpiece for removing the same from said workpiece receiving member upon rocking of said rockable member in the opposite direction.

2. A device of the class described adapted for use with a machine having a reciprocable part, comprising: a bell crank rockably mounted and pivotally connected at one end to said reciprocable part; a slidable workpiece receiving member; a shank connected to said workpiece receiving member and provided with a slot formed therein, one end of said bell crank projecting through said slot; guide members for guiding said shank in its slidable movement; and a stripper plate projecting downwardly from and adapted to engage a workpiece on said workpiece receiving member.

3. A device of the class described adapted for use with a machine having a reciprocable part, comprising: a bell crank pivotally mounted at the juncture of its two parts and pivotally connected at the end of one of said parts to said reciprocable part; a workpiece receiving member; a shank connected to said workpiece receiving member and provided with a slot, the other part of said bell crank projecting through said slot; rollers mounted on said shank in said slot and engaging opposite sides of said other part of said bell crank; guide members for guiding said shank in its reciprocating movements, said shank being reciprocated upon rocking of said bell crank; and a downwardly projecting stripper plate for engaging a workpiece on said workpiece receiving member.

4. A device of the class described adapted for use with a machine having a reciprocable part, comprising: a pivotally mounted bell crank, one end of said bell crank being pivotally attached to said reciprocable part; guide members; a shank slidably mounted in said guide members and provided with a slot; a pair of spaced rollers mounted in said slot on said shank, the opposite end of said bell crank extending through said slot between said rollers; a workpiece receiving member projecting outwardly from one end of said shank and adapted, upon rocking of said bell crank into one position, for moving into the path of said reciprocable part of said machine and for receiving a workpiece therefrom; and a stripper plate positioned above said workpiece receiving member and engageable with the workpiece thereon for removing the same therefrom upon rocking of said bell crank in the opposite direction.

5. A stock remover of the class described adapted for use with a machine having a movable part operating on a workpiece, comprising: a reciprocably mounted workpiece receiving member; means operable by said movable part for reciprocating said workpiece receiving member, the direction of reciprocation being dependent upon the direction of movement of said movable part, said workpiece receiving member upon movement of said movable part into one position being located in the path of said movable part and adapted for receiving a workpiece therefrom; and a stripper plate engageable with said workpiece for removing the same from said workpiece receiving member upon movement of said movable part into a predetermined position.

In testimony whereof we have signed the foregoing specification.

EARL D. WEAVER.
CHARLES A. COBB.